US008456317B2

(12) United States Patent
Stegmann et al.

(10) Patent No.: US 8,456,317 B2
(45) Date of Patent: Jun. 4, 2013

(54) SENSOR MODULE

(75) Inventors: Rainer Stegmann, Hoesbach (DE);
Heribert Werner, Kahl (DE)

(73) Assignee: Magna Electronics Europe GmbH & Co KG (DE)

( * ) Notice: Subject to any disclaimer, the term of this patent is extended or adjusted under 35 U.S.C. 154(b) by 529 days.

(21) Appl. No.: 12/676,624

(22) PCT Filed: Aug. 28, 2008

(86) PCT No.: PCT/DE2008/001421
§ 371 (c)(1),
(2), (4) Date: Mar. 5, 2010

(87) PCT Pub. No.: WO2009/030198
PCT Pub. Date: Mar. 12, 2009

(65) Prior Publication Data
US 2010/0308094 A1  Dec. 9, 2010

(30) Foreign Application Priority Data
Sep. 7, 2007 (DE) .................. 10 2007 042 694

(51) Int. Cl.
G08B 23/00 (2006.01)
(52) U.S. Cl.
USPC .................. 340/693.9; 224/482; 224/483
(58) Field of Classification Search
USPC ............ 340/693.9, 545.1, 545.7, 545.8, 601, 340/602, 425.5, 439; 224/482, 483; 250/214, 250/239
See application file for complete search history.

(56) References Cited

U.S. PATENT DOCUMENTS

| 4,316,757 | A |   | 2/1982  | Walsh |
|-----------|---|---|---------|-------|
| 4,883,349 | A | * | 11/1989 | Mittelhauser ............. 359/872 |
| 5,556,493 | A |   | 9/1996  | Teder et al. |
| 5,602,058 | A |   | 2/1997  | Ooizumi et al. |
| 6,326,613 | B1|   | 12/2001 | Heslin et al. |
| 6,690,268 | B2|   | 2/2004  | Schofield et al. |
| 6,824,281 | B2|   | 11/2004 | Schofield et al. |
| 7,911,356 | B2| * | 3/2011  | Wohlfahrt et al. ......... 340/693.9 |
| 8,134,117 | B2| * | 3/2012  | Heslin et al. ............. 250/239 |
| 8,192,095 | B2| * | 6/2012  | Kortan et al. ............ 396/419 |

FOREIGN PATENT DOCUMENTS

| DE | 19753879 C1 | 12/1998 |
| EP | 0803414 A   | 10/1997 |

OTHER PUBLICATIONS

International Search Report for corresponding PCT Application No. PCT/DE2008/001421 dated May 20, 2009.

* cited by examiner

Primary Examiner — Brian Zimmerman
Assistant Examiner — An T Nguyen
(74) Attorney, Agent, or Firm — Gardner, Linn, Burkhart & Flory, LLP

(57) ABSTRACT

A sensor module is mounted at a windshield of a vehicle. The sensor module can be connected, via a fastening section that is arranged on a module housing, to an element that is fixed to the vehicle body or to an element which is connected to a part that is fixed to the vehicle body. A sensor is accommodated in the module housing and is retained such that it can be displaced and/or pivoted from a first starting position into a second end position in order to rest against the windscreen. The adjusting movement can be initiated by an adjusting element which can be preloaded in the direction of the end position by means of a spring element and can be blocked in the starting position by means of a blocking element. Also, a delaying element is provided that can influence a parameter of the adjusting movement.

4 Claims, 3 Drawing Sheets

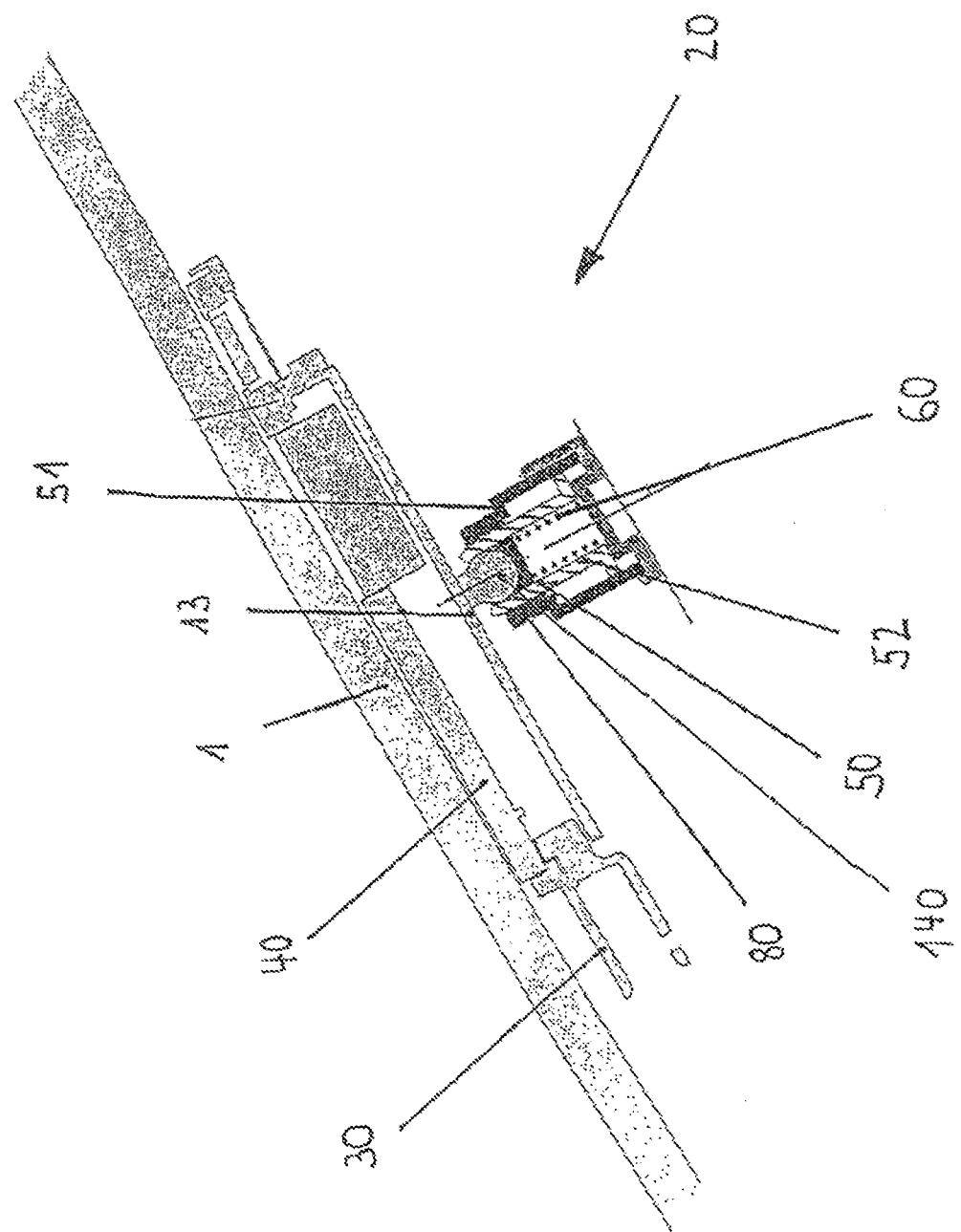

SENSOR MODULE

The invention relates to a sensor module which can be arranged in the region of a window of a motor vehicle.

Sensor modules of this type can be used for various functions, for example for sensing rain, condensation or light. Several functions may also be integrated in one sensor module. Rain sensor modules are used for automatically controlling the windshield wipers of motor vehicles. In this case the rain sensor is attached in the motor vehicle on the inner side of the windshield and in this region measures the wetting of the measuring field by moisture and raindrops on the outer side of the windshield.

Various fastening locations and fastening modes are known for fastening sensors in the region of the windshield. It is known to integrate the sensors in the fastening base of the interior rear-view mirror in the upper region of the windshield.

An arrangement integrated in the fastening base is known from DE 10 2004 007 516 A1. In order to achieve accurate placement of the components, means for defined mutual assignment of the installed positions of the two components on the windshield are provided. During installation of the two components a sensor frame of the sensor module is first bonded to the windshield and the fastening base is then fitted over the sensor module and also bonded to the windshield. However, bonding of sensors to the inner side of the windshield of motor vehicles suffers from a number of disadvantages.

Such a fastening of sensors to the windshield requires long assembly times. In addition, assembly errors can arise through a change to the intended bonding position of the windshield with respect to the vehicle body. An additional disadvantage of bonding the fastening base and the sensor to the windshield is that the bond cannot be released non-destructively in the event of maintenance, for example.

An interior mirror arrangement with a sensor integrated in the fastening base is known from DE 101 27 070 A1, which arrangement has a guide device that is connected firstly to the sensor and secondly to an adjusting element. During final assembly the sensor is positioned on the inner side of the windshield by a movement of the adjusting element. Bonding of the sensor surface is not provided in this arrangement.

Known from DE 197 11 374 A1 is an interior light module with rain sensor, the rain sensor being integrated in the housing of the interior light module. In order to achieve good contact of the rain sensor, the latter is accommodated in a recess of the module housing perpendicular to the inner surface of the windshield and is pressed against the inner surface of the windshield by means of a spring element.

It is the object of the present invention to develop a sensor module which is provided for fastening in the region of a window of a motor vehicle in such a way that simplified installation is made possible and damage to the sensor during fastening can be prevented as far as possible.

This object is achieved by the features specified in claim 1. Because of the arrangement of a delaying element and blocking of the sensor in a first starting position, the time of positioning the sensor on the windshield in a second end position can be selected variably. The displacement of the sensor from its first pre-assembly position (starting position) to a second contact position (end position) can be reversed and repeated as often as required.

The delaying element may further include a damping element or may be configured as a damping element. Jerking forward of the sensor against the windshield is thereby avoided and careful positioning of the sensor is therefore possible.

The invention and preferred exemplary embodiments are represented in the drawings and are explained in more detail below by means of the description.

In the figures:

FIG. 3 is a schematic sectional representation of a further embodiment of a sensor module.

Figure 1:
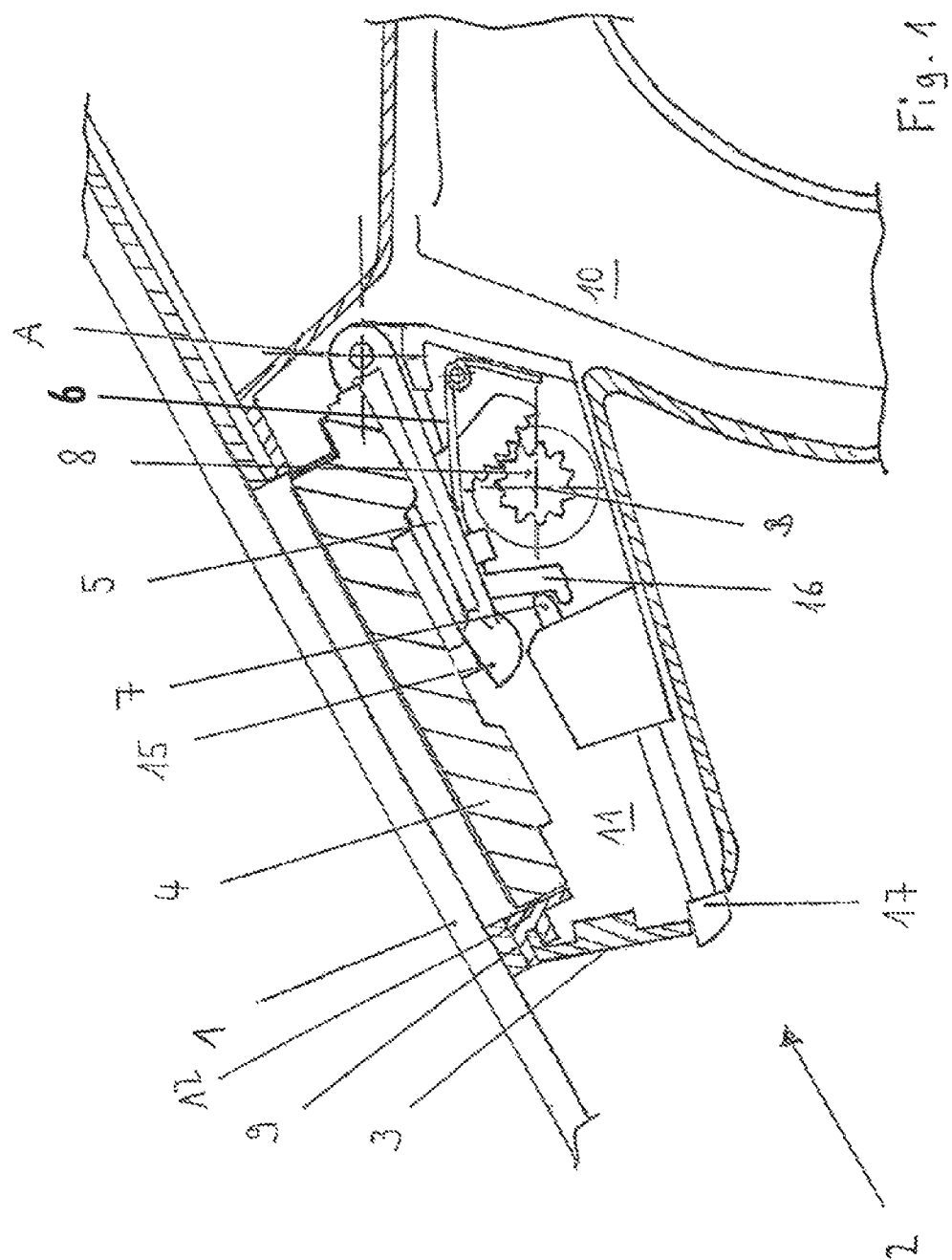
FIG. 1 is a schematic sectional representation of a sensor module, the sensor being shown in its starting position.

FIG. 1 shows schematically a portion of a glass pane 1, in particular a windshield of a motor vehicle, with a sensor module 2 resting thereagainst. The sensor module 2 comprises essentially a module housing 3, a sensor 4, a positioning element 5, a spring element 6, a blocking element 7 and a delaying element 8. So that the sensor module 2 operates correctly, the module housing 3 must remain in a fixed position relative to the inner surface of the windshield. The module housing 3 therefore has contact surfaces or sealing surfaces 9 on its side oriented towards the inner surface. For the purpose of attaching the module housing 3 preferably in the region close to the upper edge of the windshield, the module housing 3 has a fastening section 10 which can be fastened either directly to the roof lining structure or to the windshield frame of the vehicle body. A further attachment possibility is to install the fastening section 10 on the frame of a roof operating unit mounted on the roof lining structure. In this way a roof operating unit ready for connection and including an integrated sensor can be made available for installation in the vehicle interior. The exemplary embodiment is described below with reference to a rain sensor arranged in the sensor module 2. However, the following other sensors may also be arranged in the sensor module: light sensors, temperature sensors, etc.

The module housing 3 has on one side, on its side oriented towards the inner surface of the windshield, an opening which leads to a receiving space 11. A guide element 12 in which the sensor 4 is mounted is fitted in the opening. The boundary surfaces of the guide element 12 are configured as guide faces for the sensor 4. FIG. 1 shows the sensor 4 in a first, starting position, in which the measuring area of the sensor 4 is arranged at a distance from the inner surface of the windshield. The sensor 4 is arranged on a sensor carrier 13 (FIG. 2) which has a ball head (not shown in FIGS. 1 and 2) on its side oriented away from the sensor 4. The ball head is received in a corresponding ball socket 15 arranged on an adjusting element 5. The sensor 4 is therefore articulated to the adjusting element 5. Through this articulated mounting of the sensor 4 to the adjusting element 5 a correct angular position of the sensor—that is, contact of the entire surface of the measuring area of the sensor 4 with the inner surface of the windshield 1—can be ensured in all cases. The adjusting element 5 is in the form of a lever mounted about an axis of rotation A. The bearing axis is fixed in the region of the inner side of the receiving space 11. It can also be seen from the drawing that a torsion spring 6 is arranged below the adjusting element 5. Through the arrangement of the spring 6 the pressure force required for the functioning of the sensor is generated. The torsion spring is configured as spring wire in a spiral shape ending in lever-like arms. One arm bears against the underside of the lever while the other lever bears against the inside of the module housing 3. Through the above-described arrangement the lever is preloaded in the direction of the windshield 1. Upward swiveling of the lever is blocked by a blocking element 7. The blocking element 7 is in the form of a movable pin which engages behind a downwardly-oriented blocking catch 16 in the front region of the lever.

This blocking can be canceled by means of an unlocking element 17 projecting outwards through the side wall of the module housing 3. After the unlocking element 17 has been actuated, jerking forward of the lever preloaded by the spring force, with the sensor 4 articulated to the lever, is prevented by a delaying element 8 arranged in the module housing 3. In this case the delaying element 8 is in the form of a damping element and, according to the exemplary embodiment illustrated, includes a friction brake with friction surfaces made of silicone, which is pivoted about an axis of rotation B. For this purpose the friction brake is in the form of a gearwheel which meshes with an arcuate toothed segment arranged on the lever. Through this configuration a damped adjusting movement of the sensor 4 in the direction of the windshield is produced. The danger of damage to the sensor 4 by striking against the windshield is thereby considerably reduced. Guidance of the sensor 4 in the direction of the windshield is effected by the guide faces on the guide element 12.

Figure 2:
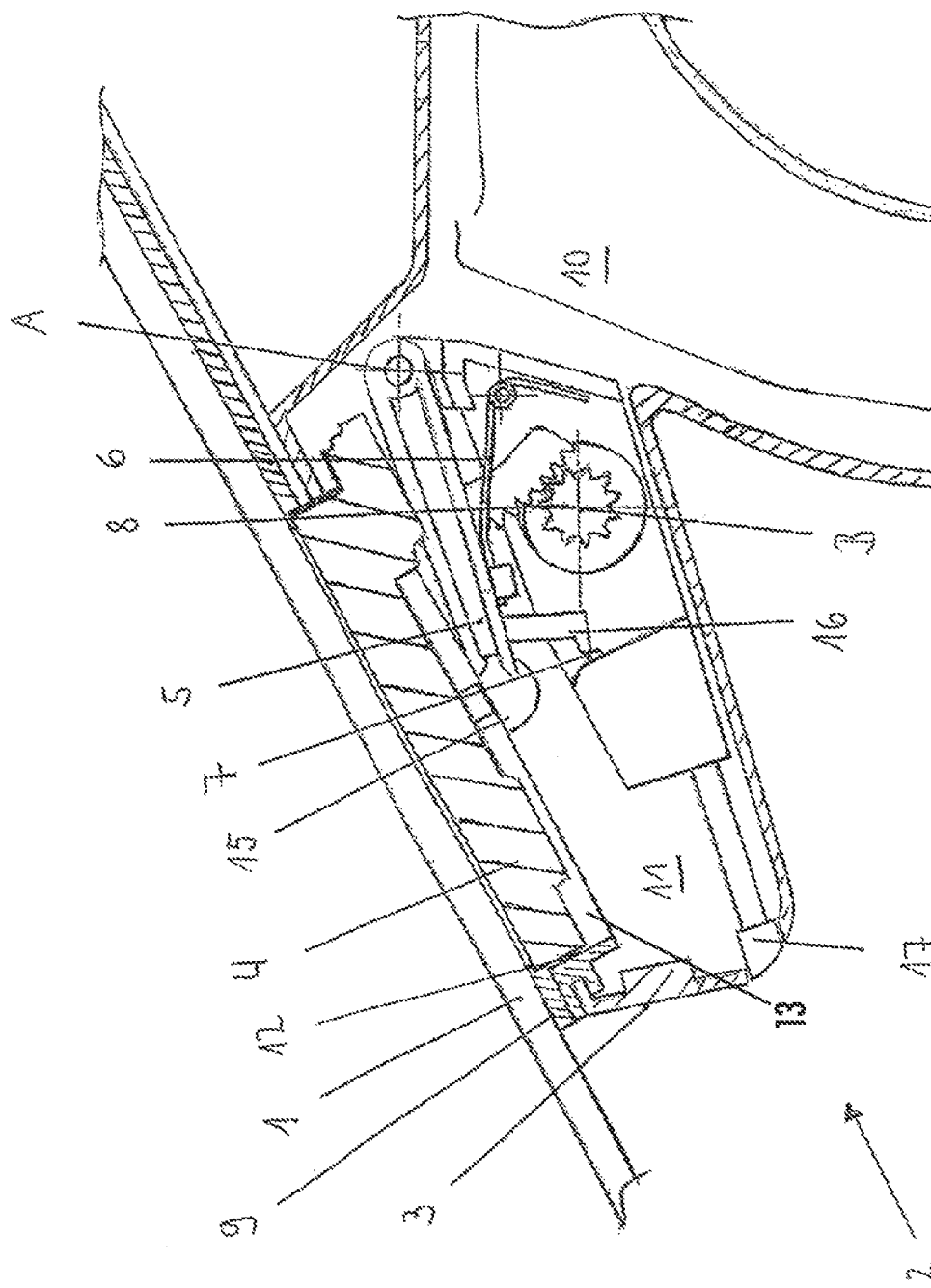
FIG. 2 is a sectional representation of the sensor module according to FIG. 1, the sensor being shown in its end position.

In FIG. 2 the sensor module 2 with sensor 4 is shown in a second end position. In this position the measuring area of the sensor 4 rests against the inner surface of the windshield 1 with a defined force predetermined by the spring.

The above-described unlocking and locking of the sensor may be effected purely mechanically, or electromechanically by means of an electrical switching signal. In the configuration of the unlocking element 17 described previously, the latter projects from the module housing 3 in the assembly position and is provided with a signal color. The current position of the sensor 4 can therefore be detected optically. The mechanical triggering of the adjustment movement transmitted to the sensor 4, described previously, may also be effected by an electrically-driven blocking element. In this case there may be provided a timing element which releases the adjusting movement of the sensor 4 from the starting position to the end position after a predetermined time. The timing element therefore also constitutes a delaying element. In a further configuration the sensor 4 may be returned to the starting position by means of an electric motor, for example for assembly purposes.

Through the above-described arrangement, the blocking and unlocking of the adjusting element 5 can be repeated as often as required. A further advantage is that the time of unlocking can be freely selected. The time of contact of the sensor 4 with the windshield 1, and therefore the loading of the windshield 1 by the contact and assembly forces during first assembly and in the event of servicing, can therefore be freely selected. This is advantageously a time situated after the curing of the bond between windshield 1 and vehicle body.

FIG. 3 shows an inventive sensor module 20 in a further configuration. Here, in contrast to the exemplary embodiment represented in FIGS. 1 and 2, the adjusting element 50 is in the form of a piston-cylinder arrangement. In this case the piston 52 mounted displaceably in a cylinder housing 51 has a hollow-cylindrical configuration and includes the bearing for the ball head 140 in its upper end region. Arranged in the piston 52 is a spring element 60 which is in the form of a conventional compression spring and bears with one end against the base region of the cylinder housing 51 and with the other against a bearing element connected to the piston 52. The piston 52 is preloaded in the direction of the windshield 1 by the above-described arrangement. A displacement of the piston 52 in the cylinder housing 51 to the second end position of the sensor 40 is blocked by a blocking element. This is not shown in the drawing. With regard to the further configurations of the blocking element and of a delaying element configured as a timing element, reference is made to the description of FIGS. 1 and 2. In the upper region of the cylinder housing 51 in which the piston 52 is guided to the outside by the cylinder housing 51, a sealing ring made of an elastic material is fitted between the inner face of the cylinder housing and the outer face of the piston. In this case the sealing ring performs the function of the damping or delaying element 80, so that the adjusting movement from the starting position of the sensor 40 to the end position is effected in a damped and time-delayed manner as a result of friction.

The sensor module can be positioned and electrically contacted in the upper region of the windshield with small assembly risks and low assembly costs as described below.

In a first step the complete sensor module may be produced in finished form as a connection-ready roof operating unit for installation in the vehicle interior. Preassembly of the roof operating unit with integrated sensor outside the vehicle interior is thereby made possible. In parallel thereto the vehicle can be assembled and the windshield bonded to the body. After the bonding of the windshield, the sensor module can be fastened to the roof lining structure by means of the fastening section and electrically connected. After the windshield/body bond has cured, the release of the locking of the positioning element may be effected manually or in a manner controlled via a timing element, and the sensor is moved to its end position as a result of the preloaded positioning element and the guidance of the sensor. Assembly errors and changing of the bonding position of the windshield in the body after positioning of the sensor are thereby avoided. An additionally provided damping element in the form of a friction brake, a hydraulic damper or, for example, a friction lining between the parts moved relative to one another during the adjusting movement prevents the sensor from jerking forward against the windshield. Damage to the sensor is thereby very largely avoided. The articulation of the sensor to the adjusting element makes possible precise abutment of the measuring area of the sensor against the windshield.

The invention claimed is:

1. A sensor module for releasable attachment of a sensor to a window of a motor vehicle, characterized in that the sensor module is connectable via a fastening section arranged on a module housing to an element which is fixed to the vehicle body or is connected to a part fixed to the vehicle body, a sensor being accommodated in the module housing and being held displaceably and/or swivelably from a first starting position to a second end position in order to rest against the window, this adjusting movement being able to be initiated by means of an adjusting element and the adjusting element being preloadable in the direction of the end position by means of a spring element and being blockable in the starting position by means of a blocking element, and in that there is further provided a delaying element by which a parameter of the adjusting movement can be influenced, characterized in that the adjusting element is in the form of a piston-cylinder arrangement which comprises a piston mounted in a longitudinally displaceable manner in a cylinder housing, characterized in that the sensor is connected to the adjusting element by an articulated joint, characterized in that the articulated connection comprises a ball head mounted in a joint socket, characterized in that the spring element is a torsion spring, one arm of which bears against the underside of a lever and the other arm of which bears against the module housing, and characterized in that the delaying element is a friction lining arranged between cylinder housing and piston.

2. The sensor module as claimed in claim 1, characterized in that the adjusting element is in the form of a pivoted lever.

3. The sensor module as claimed in claim 1, characterized in that the delaying element includes a timing element which releases the adjusting movement of the sensor from the starting position to the end position after a predetermined time.

4. The sensor module as claimed in claim 1, characterized in that the blocking element is in the form of a horizontally movable pin which engages behind a downwardly-oriented blocking catch in the front region of the lever.

* * * * *